United States Patent
Azmi et al.

(10) Patent No.: US 12,460,745 B2
(45) Date of Patent: Nov. 4, 2025

(54) VALVE TRIM APPARATUS FOR USE WITH FLUID VALVES

(71) Applicant: Fisher Controls International LLC, Marshalltown, IA (US)

(72) Inventors: Mohammad Rashid Azmi, Ames, IA (US); Trevor Stoakes, Bondurant, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 7 days.

(21) Appl. No.: 18/621,444

(22) Filed: Mar. 29, 2024

(65) Prior Publication Data
US 2024/0337331 A1    Oct. 10, 2024

Related U.S. Application Data

(60) Provisional application No. 63/494,391, filed on Apr. 5, 2023.

(51) Int. Cl.
| | |
|---|---|
| *F16K 39/04* | (2006.01) |
| *F16K 1/36* | (2006.01) |
| *F16K 1/54* | (2006.01) |
| *F16K 3/24* | (2006.01) |
| *F16K 3/26* | (2006.01) |
| *F16K 3/30* | (2006.01) |
| *F16K 3/32* | (2006.01) |
| *F16K 39/02* | (2006.01) |

(Continued)

(52) U.S. Cl.
CPC ............... *F16K 47/08* (2013.01); *F16K 1/36* (2013.01); *F16K 1/54* (2013.01); *F16K 3/246* (2013.01); *F16K 3/262* (2013.01); *F16K 3/30* (2013.01); *F16K 3/32* (2013.01); *F16K 39/024* (2013.01); *F16K 39/04* (2013.01); *F16K 3/0209* (2013.01); *F16K 3/314* (2013.01); *F16K 27/041* (2013.01)

(58) Field of Classification Search
CPC ........ F16K 39/024; F16K 39/04; F16K 3/246; F16K 3/262; F16K 3/0209; F16K 3/30; F16K 3/314; F16K 3/32; F16K 27/041; Y10T 137/88038
See application file for complete search history.

(56) References Cited

U.S. PATENT DOCUMENTS 2,200,226 A  *  5/1940  Larson .................... F16K 1/52
                                                  236/1 E
2,575,272 A  *  11/1951  Harris .................. F16K 31/408
                                                  251/39

(Continued)

*Primary Examiner* — Kenneth Rinehart
*Assistant Examiner* — Christopher D Ballman
(74) *Attorney, Agent, or Firm* — Hanley, Flight & Zimmerman, LLC

(57) ABSTRACT

A valve trim apparatus includes a valve plug having a sidewall defining a plug cavity and a plurality of throttle ports. The throttle ports are radially spaced relative to a longitudinal axis of the valve plug. The throttle ports include throttle flow passageways to provide fluid communication between an inner surface of the throttle ports and an outer surface of the sidewall of the valve plug. The valve plug includes a plurality of throttle plugs positioned in respective ones of the throttle ports and movable relative to the throttle flow passageways to control fluid flow through the throttle flow passageways when the valve plug is sealingly engaged with a valve seat.

19 Claims, 9 Drawing Sheets

(51) Int. Cl.
*F16K 47/08* (2006.01)
*F16K 3/02* (2006.01)
*F16K 3/314* (2006.01)
*F16K 27/04* (2006.01)

(56) References Cited

U.S. PATENT DOCUMENTS

| | | | | |
|---|---|---|---|---|
| 3,844,312 | A * | 10/1974 | Sumner | F16K 17/30 137/460 |
| 5,236,014 | A * | 8/1993 | Buls | F16K 47/08 137/625.3 |
| 5,339,857 | A * | 8/1994 | Scallan | F16K 31/383 251/38 |
| 5,848,608 | A * | 12/1998 | Ishigaki | F16K 41/10 251/60 |
| 6,283,152 | B1 * | 9/2001 | Corte, Jr. | F16K 39/022 251/282 |
| 6,641,110 | B1 * | 11/2003 | Nguyen | F16K 3/246 251/282 |
| 7,300,034 | B2 * | 11/2007 | Shields | F16K 1/10 251/80 |
| 8,196,892 | B2 * | 6/2012 | Glaun | F16K 47/04 251/38 |
| 8,662,110 | B2 * | 3/2014 | Alikhani | F16K 39/024 251/83 |
| 9,194,501 | B2 * | 11/2015 | Cunningham | F16K 39/022 |
| 9,218,005 | B2 * | 12/2015 | Cunningham | F16K 39/022 |
| 9,395,009 | B2 * | 7/2016 | Lovell | F16K 3/246 |
| 9,777,552 | B2 * | 10/2017 | Elliott | F16K 3/246 |
| 10,253,887 | B1 * | 4/2019 | Kloss | F16K 1/12 |
| 10,337,638 | B2 * | 7/2019 | Landrith | F16K 31/1221 |
| 10,359,128 | B2 * | 7/2019 | Griffin, Jr. | F16K 47/08 |
| 10,378,309 | B2 * | 8/2019 | Elliott | F16K 3/30 |
| 10,400,899 | B2 * | 9/2019 | Jackson | F16K 3/243 |
| 10,598,288 | B2 * | 3/2020 | Wang | F16K 25/04 |
| 10,837,576 | B2 * | 11/2020 | Merscher | F16K 1/42 |
| 11,073,225 | B2 * | 7/2021 | Klyashitsky | F16K 3/246 |
| 11,186,971 | B1 * | 11/2021 | Allen | F16K 39/024 |
| 11,339,897 | B2 * | 5/2022 | Gabriel | F16K 47/08 |
| 11,376,532 | B2 * | 7/2022 | Qiu | F16K 47/08 |
| 11,649,897 | B1 * | 5/2023 | Richardson | F16K 39/02 251/367 |
| 11,713,827 | B2 * | 8/2023 | Mears | F16K 31/128 251/62 |
| 11,994,227 | B2 * | 5/2024 | Hawkins | F16K 3/246 |
| 2014/0262333 | A1 * | 9/2014 | Frenzel | E21B 34/025 166/91.1 |
| 2019/0128441 | A1 * | 5/2019 | Zähe | F16K 3/26 |

* cited by examiner

VALVE TRIM APPARATUS FOR USE WITH FLUID VALVES

RELATED APPLICATION

This patent claims the benefit of U.S. Provisional Patent Application No. 63/494,391, which was filed on Apr. 5, 2023. U.S. Provisional Patent Application No. 63/494,391 is hereby incorporated herein by reference in its entirety. Priority to U.S. Provisional Patent Application No. 63/494,391 is hereby claimed.

FIELD OF THE DISCLOSURE

This disclosure relates generally to fluid valves and, more particularly, to valve trim apparatus for use with fluid valves.

BACKGROUND

Control valves are often used in process control plants or systems to control the flow of process fluid. Some control valves (e.g., globe valves) include a valve cage with openings through which the fluid can flow when the valve is in an open position. As the fluid exits the openings of the cage, the fluid typically interacts with a relatively stationary or low velocity fluid at an outlet of the control valve, which can cause vibration, noise and/or cavitation.

SUMMARY

An example valve trim apparatus disclosed herein includes a cage having a cylindrical wall defining a central aperture and a plurality of first openings extending between an inner surface of the cage and an outer surface of the cage. A valve seat engages the cage and a valve plug is slidably coupled to the cage and movable relative to the valve seat. The valve plug includes a sidewall defining a plug cavity and a plurality of throttle ports. The throttle ports are radially spaced relative to a longitudinal axis of the valve plug. The throttle ports include throttle flow passageways to provide fluid communication between an inner surface of the throttle ports and an outer surface of the sidewall of the valve plug. The valve plug includes a plurality of throttle plugs positioned in respective ones of the throttle ports and movable relative to the throttle flow passageways to control fluid flow through the throttle flow passageways when the valve plug is sealingly engaged with the valve seat.

An example valve disclosed herein includes a valve plug includes a cylindrical body defining an annular wall and a cavity, the cylindrical body including a first end defining a sealing surface to engage a valve seat and a second end opposite the first end to couple to a valve stem. The cylindrical body includes a plurality of throttle ports radially spaced relative to a longitudinal axis of the valve plug. The throttle ports have throttle passageways to fluidly couple an inner surface of the annular wall and an outer surface of the annular wall. A plurality of throttle plugs slidably coupled within respective ones of the throttle ports and moveable relative to the throttle passageways to control fluid flow through the throttle passageways. A plurality of throttle plug stems operatively couple respective ones of the throttle plugs to an actuator.

An example valve disclosed herein includes a valve body including an inlet, an outlet, and a fluid passageway extending between the inlet and the outlet. A valve trim apparatus is disposed in the fluid passageway. The valve trim apparatus includes a primary valve plug and a secondary valve plug. The primary valve plug is movable relative to a valve seat between a primary closed position and a primary open position. The primary valve plug includes a plurality of pressure balancing ports. The secondary valve plug is positioned in a respective one of the pressure balancing ports. The secondary valve plug is to move relative to the primary valve plug between a secondary open position and a secondary closed position. The secondary valve plug is to move from the secondary closed position to the secondary open position to enable fluid flow through the fluid passageway between the inlet and the outlet of the valve body when the primary valve plug is in the primary closed position.

Figure 1:
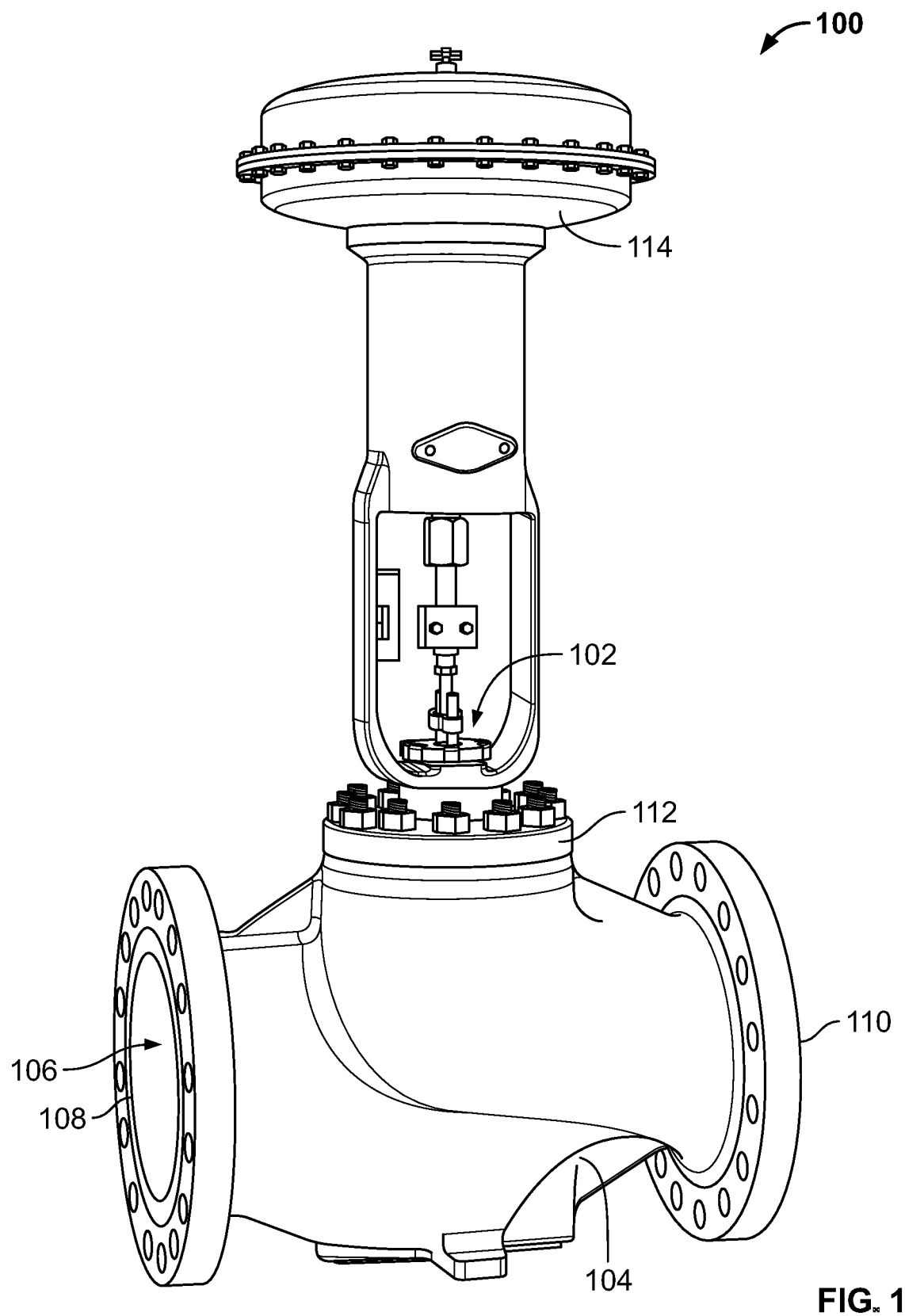
FIG. 1 is a perspective view of an example control valve having an example valve trim apparatus in accordance with teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Process control systems employ fluid control valves to control the flow of fluid from a first location to a second location. When the control valve is in a closed position, the control valve prevents fluid in a high-pressure region at a valve inlet from flowing to a lower-pressure region at a valve outlet. Alternatively, when the control valve is in an open position, the control valve allows fluid to flow from the high-pressure region to the lower-pressure region. Opening and closing of the valve can be performed manually or via a command signal from a process control system communicatively coupled to the control valve.

Some process industries such as power generation, hydrocarbon production, chemical processing, and refining, require high flow capacity control valves. Flow capacity is often measured by flow coefficient (Cv), which measures flow capability of a valve at a fully open position (e.g., Cv=a measurement of flow of water at 60 degrees Fahrenheit in gallons per minute at a pressure drop of one pound/square inch gauge (PSIG)). Additionally, to reduce vibration, noise and/or cavitation, fluid control valves often include cages. To achieve a high flow capacity (e.g., a maximum flow capacity), a cage employed with a valve trim assembly is formed or characterized with a required flow area based on a size (e.g., a diameter) of a valve body. For instance, a fluid control valve can be rated for a maximum flow capacity based on a characterized flow area provided by the cage and a port size of the valve body (e.g., 14 inches, 20 inches, etc.). Thus, cages are characterized with openings, slots, windows and/or other passageways that define flow areas for the desired flow capacity (e.g., a fluid flow coefficient Cv). However, characterizing a cage (e.g., a window cage) can be challenging when trying to achieve low flow capacity (e.g., small flow coefficients Cv) in larger sized fluid valves (e.g., fluid valves having port size diameters greater than 14 inches, 20 inches, etc.). For instance, providing low flow capacity can impact (e.g., reduce) a maximum flow capacity rating (e.g., reduces an upper limit of the flow coefficient Cv) of a given cage element. Thus, reducing the flow capacity of a cage to meet low flow demand affects (e.g., reduces) an overall or upper maximum flow capacity (a flow coefficient Cv) of the cage.

For example, during operation, process fluid flowing through a control valve undergoes a pressure drop across an orifice of the valve when the valve plug moves from a closed position to an open position, thereby causing a velocity of the fluid to increase through a passageway of the control valve. For example, a sudden pressure drop can occur when the plug moves from the closed position to the open position. In some examples, process fluid can have a relatively high pressure upstream from the cage and a reduced pressure downstream from the cage. As the fluid flows through the restriction of an open or partially open valve, a velocity of the fluid increases while a pressure of the fluid decreases. As high-velocity fluid exits the valve, the high-velocity fluid interacts with relatively stationary or low-velocity fluid at the lower-pressure region. In such cases, the interaction of fluids between the high-velocity fluid and the stationary or low-velocity fluid can cause turbulent flow, which can cause noise (e.g., excessive noise), vibration, etc.

To reduce a velocity of fluid flow across the orifice when employing larger sized valves (e.g., valve bodies having port sizes of 14 inches or greater), the cages are often characterized with low flow capacity profiles over a portion (e.g., about a 10 percent portion) of an overall length of the cage and/or over a portion of a stroke length of an actuator. As a result, as the actuator causes a valve plug to move away from a valve seat to an open position, fluid flows across an orifice through the low flow capacity portion of the cage resulting in a lower velocity flow until the actuator moves the valve plug beyond the low flow capacity profile of the cage. However, reducing the flow capacity of the cage over a portion of an overall length of the cage reduces an overall maximum flow capacity rating of the cage and/or the fluid valve. Thus, the upper flow capacity limit is sacrificed to reduce a lower capacity limit of the fluid valve.

Additionally, some larger fluid valves (e.g., valves having port diameters greater than 14 inches, 20 inches, etc.) require operation at or above a specified travel point to prevent issues with controllability, instability and/or reduce damage to trim apparatus. Due to the flow capacities of the larger fluid flow passageways, operating an actuator and/or a control valve below a certain travel point limit can cause instability, controllability issues, and/or trim damage. For instance, as a control valve approaches a closed position, a flow capacity (a flow coefficient Cv) of a fluid valve can begin to deviate from a target characteristic. In some such examples, if a control valve is operated below a certain (e.g., minimum) travel point (e.g., 10 percent travel), a gain characteristic of the fluid valve can begin to deviate from a gain characteristic achieved when the valve is operated above the recommended travel point. For example, a change in flow equals a change in valve position multiplied by gain ($\Delta q = \Delta h * Gain$). Thus, if the gain is too low, fluid flow does not change in response to valve movement, resulting in an ineffective valve for controlling flow (i.e., controllability issues). If the gain is too high, small errors in valve position will result in large errors in flow, making it difficult to accurately control a flow rate through the valve. As a result, in some instances, a small change in the position of the valve can result in an unpredictable change in flow versus an expected flow, which can result in a throttling sequence that oscillates back and forth, causing continuous variation in the process conditions (i.e., instability issues). Such a phenomenon can also cause damage to a trim apparatus due to vibration. Additionally, a low flow condition created by operating a control valve below a minimum recommended travel point can lead to valve throttling occurring essentially at a valve seat. The resultant high-velocity flow across a narrow opening can cause wear and erosion to the valve seat, cage, and/or the valve plug. Additionally, impingement in accelerated process media (e.g., due to high velocity flow) can damage (e.g., cut lines into) sealing surfaces, which can result in leakage when a valve is in a fully closed or sealing condition. Erosion to a contour of a flow control element can alter a flow characteristic of the flow control element and/or can affect an ability to control fluid flow through the valve as desired. In some examples such as a general service valve, a minimum recommended travel point is at or above 10% stroke travel of an overall stroke travel of an actuator. Thus, a cage is often characterized with a low flow capacity across the minimum recommended travel point, which can significantly decrease an upper flow capacity (a flow coefficient Cv) of the fluid valve. However, this travel point could be different for different valves. In some instances, a minimum identified operating parameter can be specified as throttling flow capacity (throttling flow coefficient Cv) instead of a minimum travel stroke point.

Example valve trim apparatus disclosed herein provide a low flow capacity (e.g., low flow coefficients Cv) without impacting or sacrificing an overall flow capacity (e.g., a maximum flow coefficient Cv) of a fluid valve and/or a cage. Specifically, example valve trim apparatus disclosed herein enable high rangeability flow characteristics while enabling achievement of low rangeability flow with accurate controllability. In other words, the maximum capacity of a given cage is not impacted by the low flow capacity characteristic, and controllability of flow over a recommended set point is not affected by the low flow capacity characteristic of the valve trim apparatus.

Additionally, example valve trim apparatus disclosed herein reduce vibration and/or noise during operation of the valve. Example trim apparatus disclosed herein can provide gradual pressure reduction in a fluid as fluid flows through the valve and reduce sudden pressure drops to reduce vibration. To provide low flow characteristics, example valve trim apparatus disclosed herein employ a secondary flow passage between a primary inlet and a primary outlet of the fluid valve that is formed through a primary valve plug. Additionally, example valve trim apparatus disclosed herein use a secondary flow control member to control the flow fluid through the secondary flow passageway while the primary valve plug is in a closed position (e.g., a fully closed position). As a result, the example valve trim apparatus described herein enable a single valve to control a throttling function separately from a shut-off function. For example, a first flow control member (e.g., a throttle plug) can move relative to a secondary flow control member (e.g., a primary valve plug) to provide a first fluid flow characteristic (e.g., low flow capacity) through a passageway of the fluid valve and the second flow control member can move relative to an orifice to provide a second fluid flow characteristic (e.g., high flow capacity) through the passageway. More specifically, the first flow control member (e.g., a throttle plug) disclosed herein may move relative to a second flow control member (e.g., a primary valve plug) along a first portion of a stroke length of an actuator (e.g., as the first flow control member moves to an open position) and the second flow control member moves with the first flow control member along a second portion of the stroke length of the actuator (e.g., as the second flow control member moves to the open position). In some examples, the first flow control member (e.g., a throttle plug) can move independently relative to the second flow control member (e.g., a primary valve plug) along at least a portion of a stroke length of an actuator.

FIG. 1 is a perspective side view of a control valve 100 having an example valve trim apparatus 102 in accordance with teachings of this disclosure. The control valve 100 of FIG. 1 includes a valve body 104 defining a fluid flow passageway 106 between an inlet 108 and an outlet 110. A bonnet 112 couples an actuator 114 and the valve body 104 and secures the valve trim apparatus 102 within the valve body 104. The actuator 114 of the illustrated example is a pneumatic actuator (e.g., a diaphragm actuator, a piston actuator, a spring-return, double-acting actuator, etc.). However, in some examples, the actuator 114 can be an electronic actuator, a manual actuator (e.g., a handwheel) and/or any other type of actuator. The control valve 100 of the illustrated example is a sliding stem valve in a flow-up configuration. However, in some examples, the control valve 100 can be configured as a flow-down device. In such examples, the flow direction can be reversed (e.g., the fluid flows through the valve body 104 from the outlet 110 to the inlet 108). While examples disclosed herein are described in association with sliding stem control valves, examples disclosed herein can be used in any type of valve (e.g., rotary valves, etc.).

Figure 2A:
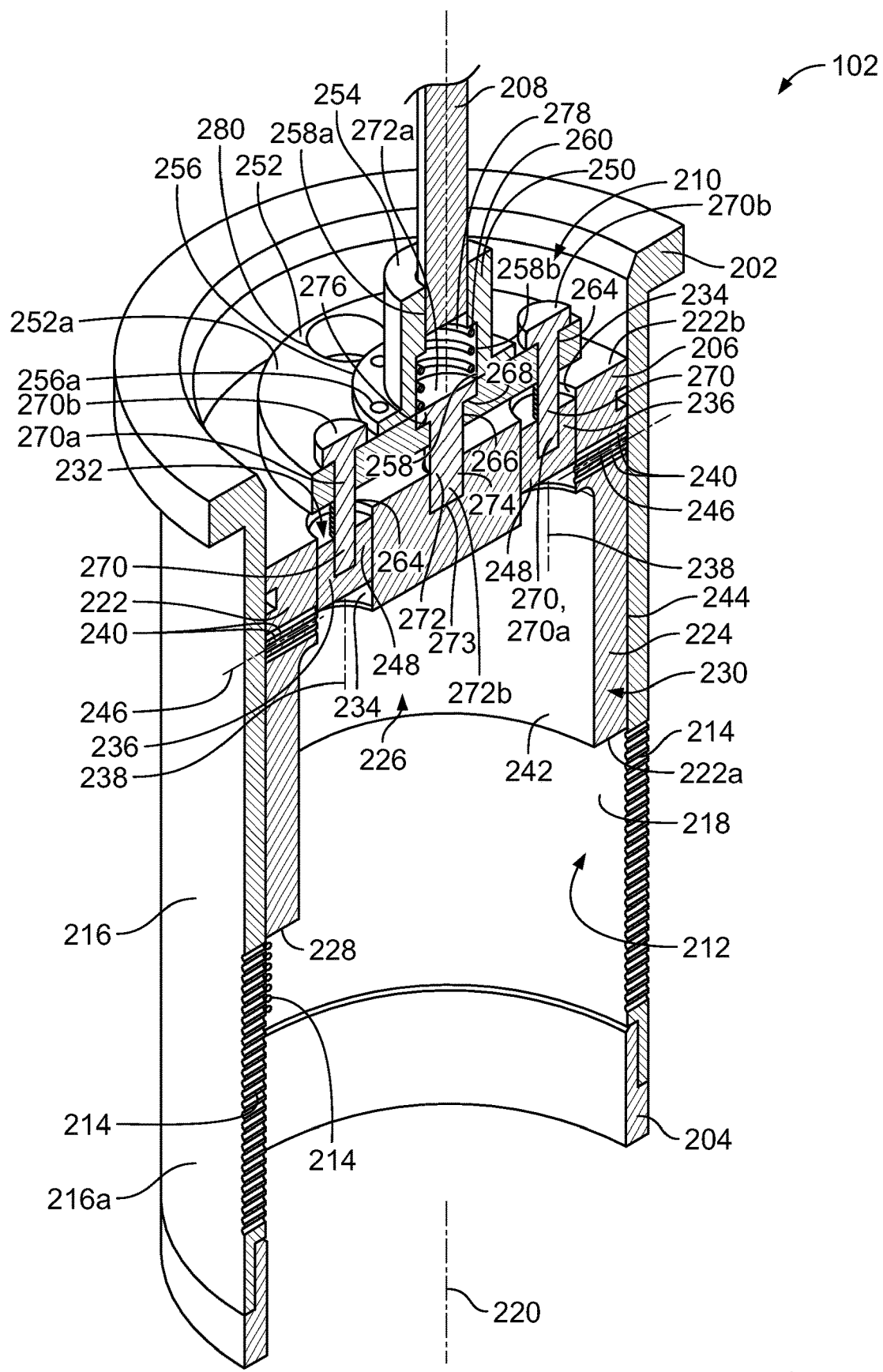
FIG. 2A is a perspective, cross-sectional view of the example valve trim apparatus of FIG. 1.
Figure 2B:
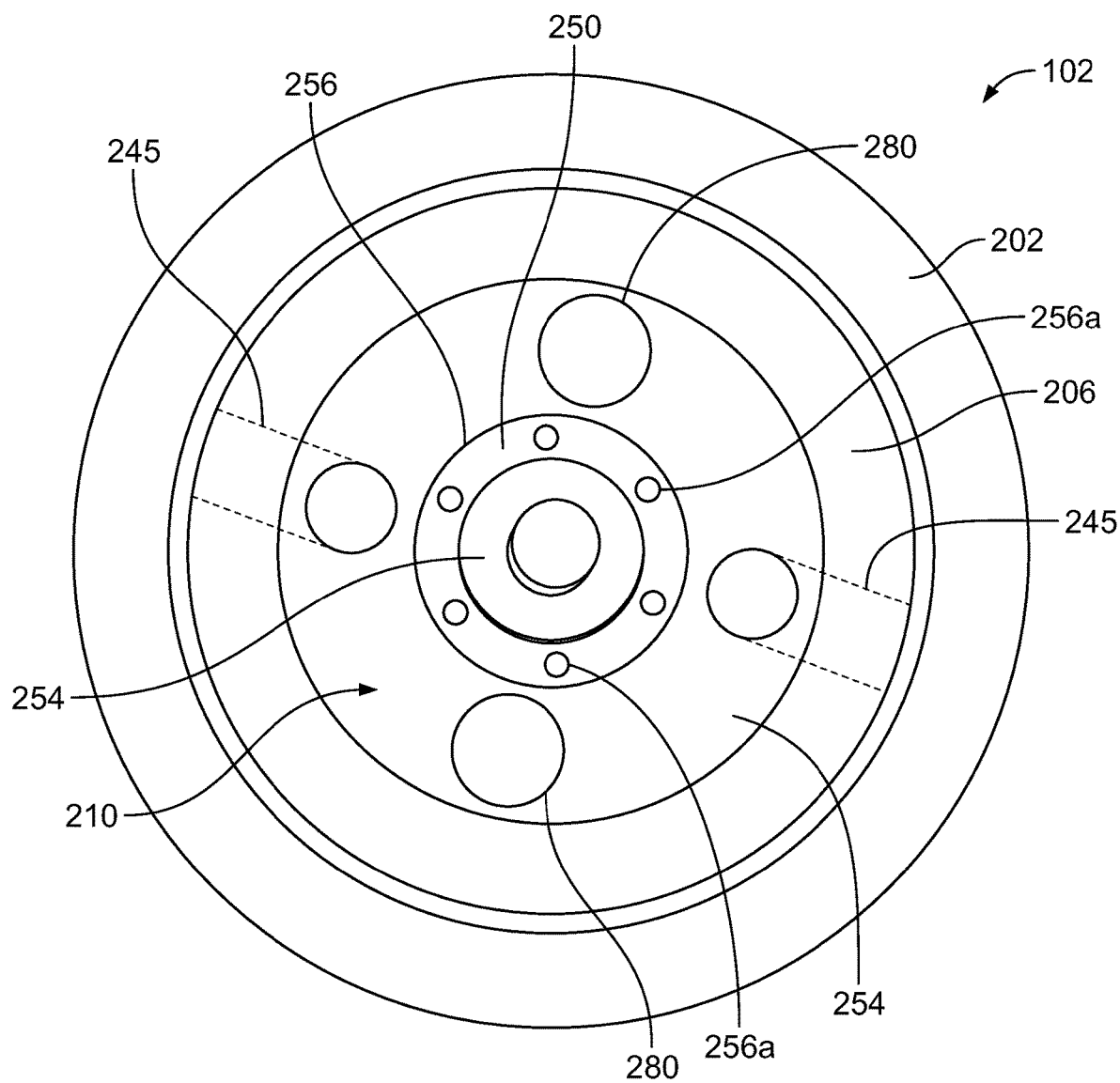
FIG. 2B is a top view of the example valve trim apparatus of FIG. 2A.

FIG. 2A is a perspective, cross-sectional view of the example valve trim apparatus 102 of FIG. 1. FIG. 2B is a top view of the example valve trim apparatus 102 of FIG. 2A. The valve trim apparatus 102 of the illustrated example includes a cage 202, a valve seat 204, and a valve plug 206 (e.g., a first or primary fluid control member). The valve plug 206 couples to the actuator 114 (FIG. 1) via a valve stem 208. To couple the valve plug 206 and the valve stem 208, the valve trim apparatus 102 of the illustrated example includes a stem connector assembly 210.

The cage 202 of the illustrated example is a cylindrical body that includes a central aperture 212 (e.g., a cavity or axial opening) and a plurality of cage passageways or cage openings 214 (e.g., apertures, holes, slots, windows, etc.) formed through a sidewall 216 of the cage 202. The cage openings 214 fluidly couple an inner surface 218 of the sidewall 216 of the cage 202 and an outer surface 216a of the sidewall 216 of the cage 202. The cage openings 214 provide a flow area of the cage 202 that defines a flow capacity (e.g., a flow coefficient (Cv)) of the control valve 100. Although the cage openings 214 of the illustrated example are holes having a uniform diameter, the cage openings 214 can have a varying diameter, can be a slot, a window, a plurality of holes and/or any other opening to enable fluid flow through the control valve 100. Additionally, the cage openings 214 are substantially perpendicular to the central aperture 212. However, in other examples, the cage openings 214 can be oriented at an angle relative to a longitudinal axis 220 of the valve trim apparatus 102. The longitudinal axis 220 of the valve trim apparatus 102 of the illustrated example is concentrically and coaxially aligned with a longitudinal axis of the cage 202. Thus, the longitudinal axis 220 defines a longitudinal axis of the cage 202.

The valve plug 206 of the illustrated example is a cylindrical body 222 defining an annular wall 224 (e.g., a cylindrical wall) and a plug cavity 226. The cylindrical body 222 includes a first end 222a defining a sealing surface 228 (e.g., an annular sealing surface) to engage the valve seat 204 and a second end 222b opposite the first end 222a to couple to the valve stem 208. The sealing surface 228 of the valve plug 206 of the illustrated example moves relative to the valve seat 204 to provide primary fluid flow control through the control valve 100. Thus, movement of the valve plug 206 relative to the valve seat 204 provides a primary flow control member 230. The longitudinal axis 220 of the valve trim apparatus 102 of the illustrated example is concentrically and coaxially aligned with a longitudinal axis of the valve plug 206. Thus, the longitudinal axis 220 defines a longitudinal axis of the valve plug 206.

Additionally, the valve plug 206 of the illustrated example includes a secondary flow control member 232. The secondary flow control member 232 provides secondary flow control through the fluid flow passageway 106 of the control valve 100. Specifically, the secondary flow control member 232 moves relative to the primary flow control member 230 (e.g., across a first stroke-length of the actuator 114 of FIG. 1) to enable fluid flow through the control valve 100 when the primary flow control member 230 is in sealing engagement with the valve seat 204 (e.g., a primary closed position). Thus, although valve plug 206 is in sealing engagement with the valve seat 204 to prevent fluid flow through the control valve 100, the secondary flow control member 232 can be actuated or moved relative to the valve plug 206 to enable fluid flow (e.g., a low flow capacity Cv) through the control valve 100.

To provide secondary flow control, the secondary flow control member 232 and/or the valve plug 206 (e.g., the cylindrical body 222) of the illustrated example includes a plurality of throttle ports 234 and a plurality of throttle plugs 236. The throttle ports 234 of the illustrated example are radially spaced relative to the longitudinal axis 220 of the valve plug 206. Each of the throttle ports 234 has a longitudinal axis 238 that is substantially parallel (e.g., perfectly parallel) relative to the longitudinal axis 220. The throttle ports 234 of the illustrated example are holes or bores that extend (e.g., fully extend) through the cylindrical body 222 between the second end 222b of the cylindrical body 222 and the plug cavity 226. Thus, the plug cavity 226 is in fluid communication with the throttle ports 234. Additionally, the throttle ports 234 are accessible via the second end 222b of the cylindrical body 222.

Each of the throttle ports 234 has one or more port openings 240 (e.g., throttle passageways, flow paths, etc.). The port openings 240 are formed in the cylindrical body 222 of the valve plug 206. Specifically, the port openings 240 fluidly couple an inner surface 242 of the annular wall 224 and an outer surface 244 of the annular wall 224. In particular, the port openings 240 provide fluid communication between the plug cavity 226 and the outer surface 244 of the cylindrical body 222 of the valve plug 206 via the throttle ports 234. Longitudinal axes 246 of the port openings 240 are at least one of non-parallel or perpendicular relative to the longitudinal axis 220. In the orientation of FIG. 2A, the throttle ports 234 are in a vertical orientation and the port openings 240 are in a horizontal orientation. In some examples, the port openings 240 can be at an angle relative to the longitudinal axis 220 and/or horizontal. Additionally, the port openings 240 of the illustrated example have a uniform or constant diameter between the throttle ports 234 and the outer surface 244 of the annular wall 224. However, in some examples, the throttle ports 234 can have a diameter or shape that varies (e.g., increases and/or decreases) between throttle ports 234 and the outer surface 244 of the annular wall 224. Additionally, the port openings 240 are shaped or positioned complementary to a shape or position of the cage openings 214. In this manner, the port openings 240 align with the cage openings 214 when the valve plug 206 is in engagement with the valve seat 204. As shown, the cage openings 214 are spaced apart and stacked vertically or in a single column along the longitudinal axis 220. Likewise, the port openings 240 are stacked vertically or in a single column along the longitudinal axis 220. For example, the port openings 240 are spaced apart along the longitudinal axis 220. The port openings 240 of the illustrated example are provided in a grid having five rows and one column. However, in other examples, the port openings 240 can be provided in a grid having any number of rows and columns as needed (e.g., to achieve a desired low flow coefficient (Cv)). In some examples, the port openings 240 can be spaced or formed about a segment or circumference of the cylindrical body 222 and/or the throttle ports 234 such that the port openings 240 are not in a vertically stacked orientation (e.g., a grid having five columns and a single row). For example, a flow profile 245 of the port openings 240 relative to a circumference of the valve plug 206 is shown in FIG. 2B in dashed lines.

The throttle plugs 236 are positioned in respective ones of the throttle ports 234. The throttle plugs 236 are movable relative to the port openings 240 to control fluid flow through the port openings 240 (e.g., when the valve plug 206 is sealingly engaged with the valve seat 204). Thus, the secondary flow control member 232 of the valve plug 206 can move independently relative to the primary flow control member 230. The throttle plugs 236 have a cylindrical body 248 and can slide or move within the respective ones of the throttle ports 234. In the illustrated example, the valve plug 206 includes two of the throttle ports 234 and the throttle plugs 236. However, in some examples, the valve plug 206 can include only one of the throttle ports 234 and the throttle plugs 236. In some examples, the valve plug 206 can include three of the throttle ports 234 and the throttle plugs 236 and/or any number of throttle ports 234 and the throttle plugs 236.

To couple the valve plug 206 and the throttle plugs 236 to the actuator 114 (FIG. 1), the valve trim apparatus 102 of the illustrated example includes the stem connector assembly 210. The stem connector assembly 210 of the illustrated example includes a stem connector 250 and a retaining plate 252. Specifically, the stem connector 250 operatively couples the valve plug 206 and the actuator 114. Additionally, the stem connector 250 couples the retaining plate 252 and the valve stem 208. The stem connector 250 of the illustrated example includes a stem body 254 (e.g., a cylindrical body) and a stem flange 256 protruding from an end of the stem body 254. The stem connector 250 defines a central opening 258 having a stepped surface 260 between a first portion 258a of the central opening 258 and a second portion 258b of the central opening 258. The first portion 258a of the illustrated example is threaded to threadably receive an end of the valve stem 208. However, in other examples, the valve stem 208 is welded, pined and/or otherwise attached to the stem connector 250. The second portion 258b defines a spring chamber between the stepped surface 260 and an end (e.g., the stem flange 256) of the stem connector 250.

The stem connector 250 of the illustrated example is fixed to the retaining plate 252. For instance, to couple the stem connector 250 and the retaining plate 252, the stem flange 256 of the stem connector 250 of the illustrated example includes apertures 256a to receives fasteners (e.g., bolts, screws, etc.) to couple the stem connector 250 and the retaining plate 252. However, in some examples, the stem connector 250 and the retaining plate 252 are coupled via welding and/or any other fastener(s). In other words, the stem connector 250 and the retaining plate 252 move together as a unitary structure. Thus, movement of the valve stem 208 and/or the stem connector 250 in a rectilinear direction along the longitudinal axis 220 causes movement of the retaining plate 252 in a rectilinear direction along the longitudinal axis 220.

The retaining plate 252 of the illustrated example is a cylindrical body. The retaining plate 252 includes a plurality of throttle stem apertures 264 (e.g., holes, threaded openings) radially spaced relative to the longitudinal axis 220. Additionally, the retaining plate 252 includes a central opening 266 having or defining a stepped surface 268 (e.g., defined by a counterbore).

The retaining plate 252 operatively couples the throttle plugs 236 and the actuator 114. To couple the throttle plugs 236 and the retaining plate 252 and/or the actuator 114 (FIG. 1), the valve trim apparatus 120 of the illustrated example includes a plurality of throttle plug stems 270. The throttle plug stems 270 of the illustrated example operatively couple respective ones of the throttle plugs 236 to the retaining plate 252. Specifically, the throttle plug stems 270 are threaded to the retaining plate 252 and the throttle plugs 236. Specifically, the throttle plug stems 270 are positioned in the throttle stem apertures 264 of the retaining plate 252. In particular, first ends of the throttle plug stems 270 are fixed (e.g., threaded) to the retaining plate 252 and the second ends of the throttle plug stems 270 opposite the first ends are fixed (e.g., threaded) to respective ones of the throttle plugs 236. Thus, the throttle plug stems 270 at least partially extend in respective ones of the throttle ports 234. Each of the throttle stems includes a cylindrical body 270a and a flange 270b. The cylindrical body 270a is coupled to a respective one of the throttle plugs 236 and passes through respective a respective one of the throttle stem apertures 264 of the mounting plate 252. The flange 270b of respective ones of the throttle plug stems 270 engages the retaining plate 252. Specifically, the flange 270b engages a first surface 252a of the retaining plate 252 oriented toward the stem connector 250 opposite a second surface of the retaining plate 252 oriented toward the valve plug 206. The stem connector 250 is coupled to the first surface of the retaining plate 252. The throttle plug stems 270 of the illustrated example are bolts or threaded fasteners. However, in some examples, the throttle plug stems 270 can be pins, rods, etc., that can be welded to the throttle plugs 236 and the retaining plate 252. The throttle plug stems 270 are fixed (e.g., do not slide) relative to the retaining plate 252 and the throttle plugs 236.

The retaining plate 252 operatively couples the valve plug 206 and the stem connector 250. To enable the retaining plate 252 to operatively couple the valve plug 206 and the stem connector 250, the valve trim apparatus 102 of the illustrated example includes an inner stop 272 (e.g., a pin). Specifically, the inner stop 272 of the illustrated example slidably couples the stem connector 250 and the valve plug 206 (e.g., over a portion of an overall stroke length of the actuator 114 of FIG. 1). The inner stop 272 has a first portion or first end 272a slidably coupled to the stem connector 250 and a second portion or second end 272b opposite the first end 272a fixed to the valve plug 206. For example, the valve plug 206 includes an aperture 273 (e.g., a threaded bore) to receive (e.g., threadably receive) the second end 272b of the inner stop 272. Thus, the inner stop 272 is slidably coupled to the stem connector 250 and the retaining plate 252 and is fixed or attached to the valve plug 206. The inner stop 272 includes a body 274 and a flange 276. The first end 272a of the body 274 defines the flange 276 and is to slide relative to the stem connector 250. Specifically, the central opening 258a of the stem connector 250 and the central opening 266 of the retaining plate 252 slidably receives the inner stop 272. In other words, the flange 276 moves within the stem connector opening 258a and the central opening 266 of the retaining plate 252 between the stepped surface 260 and the stepped surface 268.

To bias the inner stop 272 toward the valve plug 206, the stem connector 250 of the illustrated example includes a biasing element or spring 278. The spring 278 is disposed within the stem opening 258a and positioned between the inner stop 272 (e.g., the flange 276) and the stepped surface 260. In the illustrated example, the spring 278 is a coil spring. However, in other examples, the spring 278 can be a Bellville spring, a stack of Bellville springs, leaf springs and/or any other biasing element(s).

To pressure-balance the valve plug 206, the valve plug 206 of the illustrated example includes a plurality of pressure-balancing ports 280. The pressure-balancing ports 280 are radially spaced relative to the longitudinal axis 220 of the valve plug 206. Additionally, the pressure-balancing ports 280 are radially spaced relative to the throttle ports 234 about the longitudinal axis 220. In some examples, the pressure-balancing ports 280 are omitted. In some examples, one or more plugs or caps can be inserted into the pressure-balancing ports 280 to seal or close the ports when pressure-balancing is not needed. In some examples, a valve plug in the field having pressure-balancing ports can be retrofit with a secondary flow control member 232 disclosed herein. In some examples, valve plugs in the field can be retrofit with the port openings 240 (e.g., via machining or drilling) and a throttle plug can be inserted in the throttle port.

The valve plug 206 and the stem connector assembly 210 can be pre-assembled prior to coupling to the valve body 104 and/or the cage 202. For example, the throttle plug stems 270 can be attached or threaded to the retaining plate 252. The throttle plugs 236 can then be fastened to respective ones of the throttle plugs 236. The throttle plugs 236 can then be positioned in respective ones of the throttle ports 234. The inner stop 272 is then fastened to the aperture 273 of the valve plug 206. The spring 278 is positioned in the stem connector opening 258a and the stem connector 250 is coupled to the retaining plate 252. In some examples, the valve plug 206 and/or the stem connector assembly 210 can be formed via machining, casting, injection molding, and/or any other manufacturing processes. In some examples, the valve plug 206 and/or the stem connector assembly 210 (e.g., the valve plug 206, the throttle plugs 236, the throttle plug stems 270, the retaining plate 252, the stem connector 250, the spring 278, the inner stop 272) can be formed via additive manufacturing processes and techniques. In some examples, the valve plug 206, the stem connector 250, the retaining plate 252, the throttle plugs 236, the throttle stems 270, the inner stop 272, and/or the spring 278 can be formed via additive manufacturing.

Figure 3:
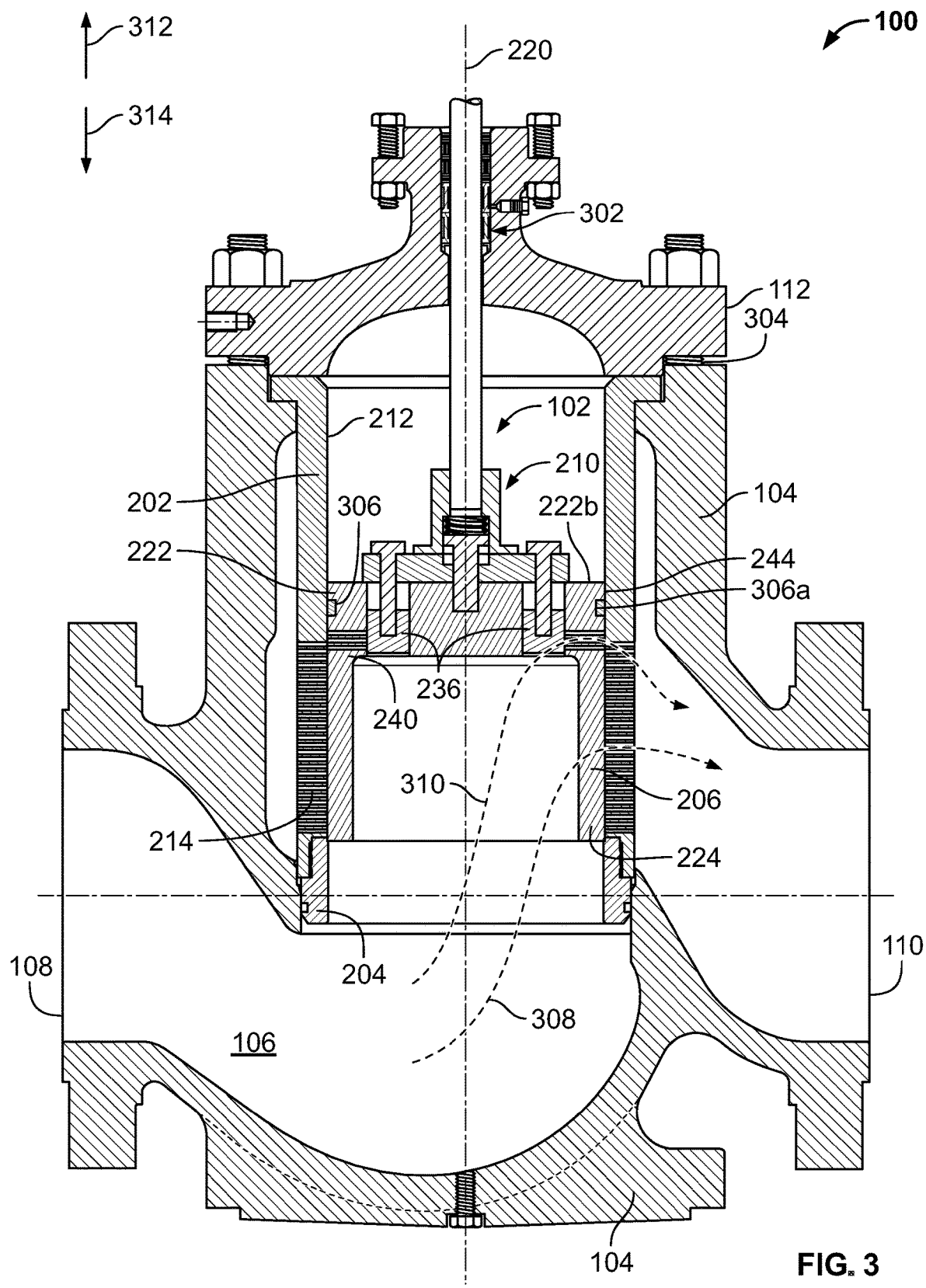
FIG. 3 is a cross-sectional front view of the example control valve of FIG. 1.

FIG. 3 is a cross-sectional side view of the control valve 100 of FIG. 1. The control valve 100 is shown without the actuator 114. The valve trim apparatus 102 is positioned in the fluid flow passageway 106 of the valve body 104 between the inlet 108 and the outlet 110. The valve seat 204 of the illustrated example is coupled to the valve body 104. The cage 202 is coupled to the valve seat 204. The bonnet 112 retains the valve trim apparatus 102 (e.g., the cage 202 and the valve seat 204) in the fluid flow passageway 106. The valve plug 206 is slidably disposed in the central aperture 212 of the cage 202 and is movable in a rectilinear direction along the longitudinal axis 220 relative to the valve seat 204 (e.g., and the cage 202). Additionally, the pressure-balancing ports 280 enable pressure to equalize across the valve plug 206 to reduce an actuation force needed to move the valve plug 206 relative to the valve seat 204. The bonnet 112 of the illustrated example includes packing 302 and a bonnet seal 304 to prevent or restrict fluid in the fluid flow passageway 106 from leaking to the environment. Additionally, the outer surface 244 of the valve plug 206 includes an annular groove 306 to receive a seal 306a (e.g., an O-ring) to prevent fluid leakage between the valve plug 206 and the cage 202. The annular groove 306 is positioned above the port openings 240 (e.g., between the port openings 240 and the second end 222b of the cylindrical body 222).

In operation, the valve plug 206 moves or slides within the central aperture 212 of the cage 202 between a closed position such that the annular wall 224 covers the cage openings 214 of the cage 202 and sealingly engages the valve seat 204 to prevent fluid flow through the fluid flow passageway 106 and an open position such that the sealing surface 228 disengages the valve seat 204 and the annular wall 224 uncovers the cage openings 214 to allow fluid flow through the fluid flow passageway 106. However, the example trim apparatus 102 of the illustrated example provides a gradual pressure reduction across the valve seat 204 to prevent a sudden pressure drop of fluid through the cage 202 when the control valve 100 moves from a closed position to an open position. For instance, absent a gradual pressure reduction, a velocity of a process fluid can increase rapidly, which can cause vibration, noise and/or cavitation in the control valve 100 and reduce functionality, increase maintenance and/or degrade a performance characteristic (e.g., sealing characteristic, a shutoff classification, etc.) of the control valve 100.

To prevent or reduce vibration, reduce high-velocity fluid flow, reduce noise and/or prevent cavitation, the example valve trim apparatus 102 of the illustrated example gradually reduces a pressure differential and/or gradually increases a velocity of the fluid flow across the valve seat 204 when the control valve 100 moves to an open position. For instance, the example valve trim apparatus 102 of the illustrated example throttles the fluid flow through the fluid flow passageway 106 prior to moving the valve plug 206 away from the valve seat 204 to an open position. Specifically, in operation, the valve plug 206 provides a primary flow path 308 via the cage openings 214 and a secondary flow path 310 via the port openings 240.

In particular, to move the control valve 100 to an open position, the actuator 114, via the stem connector assembly 210, causes the throttle plugs 236 to move relative to the port openings 240 during a first stroke length of the actuator 114 and causes the valve plug 206 to move relative to the cage openings 214 during a second stroke length of the actuator 114 different than the first stroke length of the actuator 114. For example, the actuator 114 moves the throttle plugs 236 relative to the port openings 240 to control fluid flow through the fluid flow passageway 106 via the secondary flow path 310 over a first stroke length of the actuator 114 and moves the valve plug 206 relative to the cage 202 to control fluid flow through the fluid flow passageway 106 via the primary flow path 308 over a second stroke length of the actuator 114. The actuator 114 moves the throttle plugs 236 in a first direction 312 (e.g., a rectilinear or upward direction in the orientation of FIG. 3) along a first stroke length of the actuator 114 to allow fluid flow from the inlet 108 to the outlet 110 via the secondary flow path 310, and moves the valve plug 206 in the first direction 312 away from the valve seat 204 along a second stroke length of the actuator 114 to allow fluid flow from the inlet 108 to the outlet 110 via the primary flow path 308.

Conversely, the actuator 114 moves the valve plug 206 in a second direction 314 (e.g., a rectilinear or a downward direction in the orientation of FIG. 3) toward the valve seat 204 along the second stroke length of the actuator 114 to prevent fluid from flowing between the inlet 108 and the outlet 110 via the primary flow path 308, and moves the throttle plugs 236 in the second direction 314 along the first stroke length of the actuator 114 to prevent fluid flowing between the inlet 108 and the outlet 110 via the secondary flow path 310. In some examples, the control valve 100 can be positioned in a partially open position or in a partially closed position (e.g., between a fully open position and a fully closed position) to control the flow rate through the control valve 100.

In operation, prior to moving the valve plug 206 to an open position, the throttle plugs 236 move to an open position to reduce (e.g., equalize or balance) a pressure differential between the inlet 108 and the outlet 110. When the throttle plugs 236 are in an open position, a high-pressure fluid can flow through the secondary flow path 310 between the inlet 108 and the outlet 110 to reduce a pressure differential between the inlet 108 and the outlet 110 while the valve plug 206 is in sealing engagement with the valve seat 204 to prevent or restrict fluid flow through the primary flow path 308. FIGS. 4-7 illustrate an example sequence of operation of the control valve 100.

Figure 4:
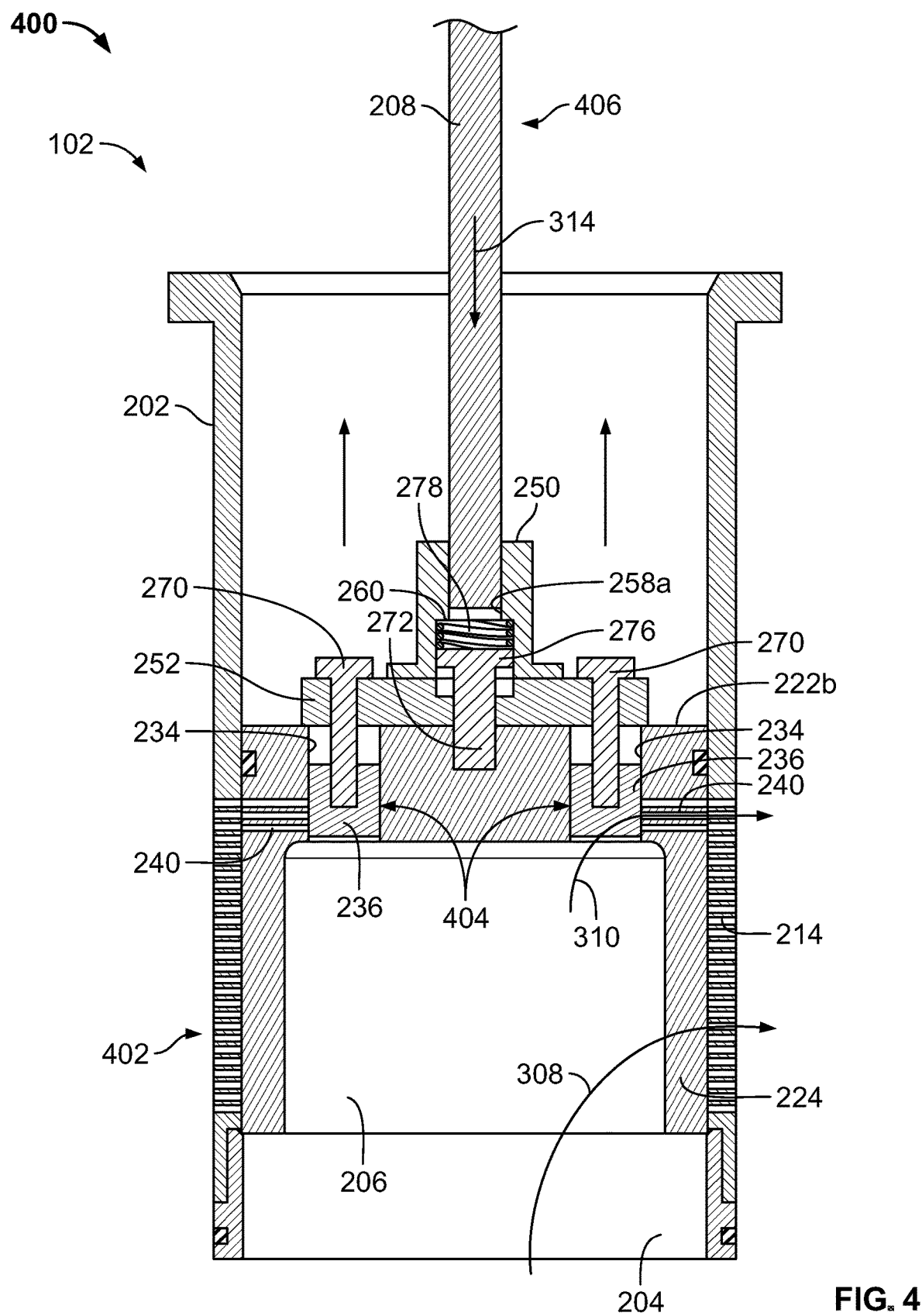
FIG. 4 is a cross-sectional front view of the example valve trim apparatus of FIGS. 1, 2A, 2B and 3 shown in an example first operative position.

FIG. 4 is a cross-sectional front view of the example trim apparatus 102 shown in an example first operative position 400. In the first operative position 400, the valve plug 206 is in is in a primary closed position 402 (e.g., a fully closed position) to prevent fluid flow through the primary flow path 308 and the throttle plugs 236 are in a secondary closed position 404 (e.g., a fully closed position) to prevent fluid flow through the secondary flow path 310. In the primary closed position 402, the valve plug 206 sealingly engages the valve seat 204 and the annular wall 224 covers or blocks the cage openings 214 of the cage 202 to prevent fluid flow through the cage 202 and, thus, through the fluid flow passageway 106 (FIG. 3) between the inlet 108 and the outlet 110. In the secondary closed position 404, the throttle plugs 236 are positioned in the throttle ports 234 to cover or block the port openings 240 to prevent fluid flow through the valve plug 206 and, thus, through the fluid flow passageway 106 between the inlet 108 and the outlet 110. Thus, in the first operative position 400, the control valve 100 is in a fully closed position such that fluid flow is prevented or restricted through the primary flow path 308 and the secondary flow path 310.

The actuator 114 of the illustrated example is in a zero or initial stroke length position 406 to provide the valve plug 206 in the primary closed position 402 and the throttle plugs 236 in the secondary closed position 404. In the initial stroke length position 406, the retaining plate 252 is engaged with (e.g., is in direct contact or engagement with) the second end 222b of the valve plug 206. Additionally, the inner stop 272 is positioned in the stem connector opening 258a adjacent the stepped surface 260 of the stem connector 250. The flange 276 of the inner stop 272 compresses the spring 278 against the stepped surface 260. The actuator 114, via the valve stem 208, the stem connector 250 and the retaining plate 252 imparts a closing force to the valve plug 206 in the second direction 314 to cause the valve plug 206 to sealingly engage the valve seat 204. Additionally, with the valve plug 206 in the primary closed position 402, the port openings 240 at least partially align with one or more cage openings 214 (e.g., flow passageways). However, when the throttle plugs 236 are in the secondary closed position 404, the throttle plugs 236 cover or block the port openings 240 to prevent fluid flow through the port openings 240.

Figure 5:
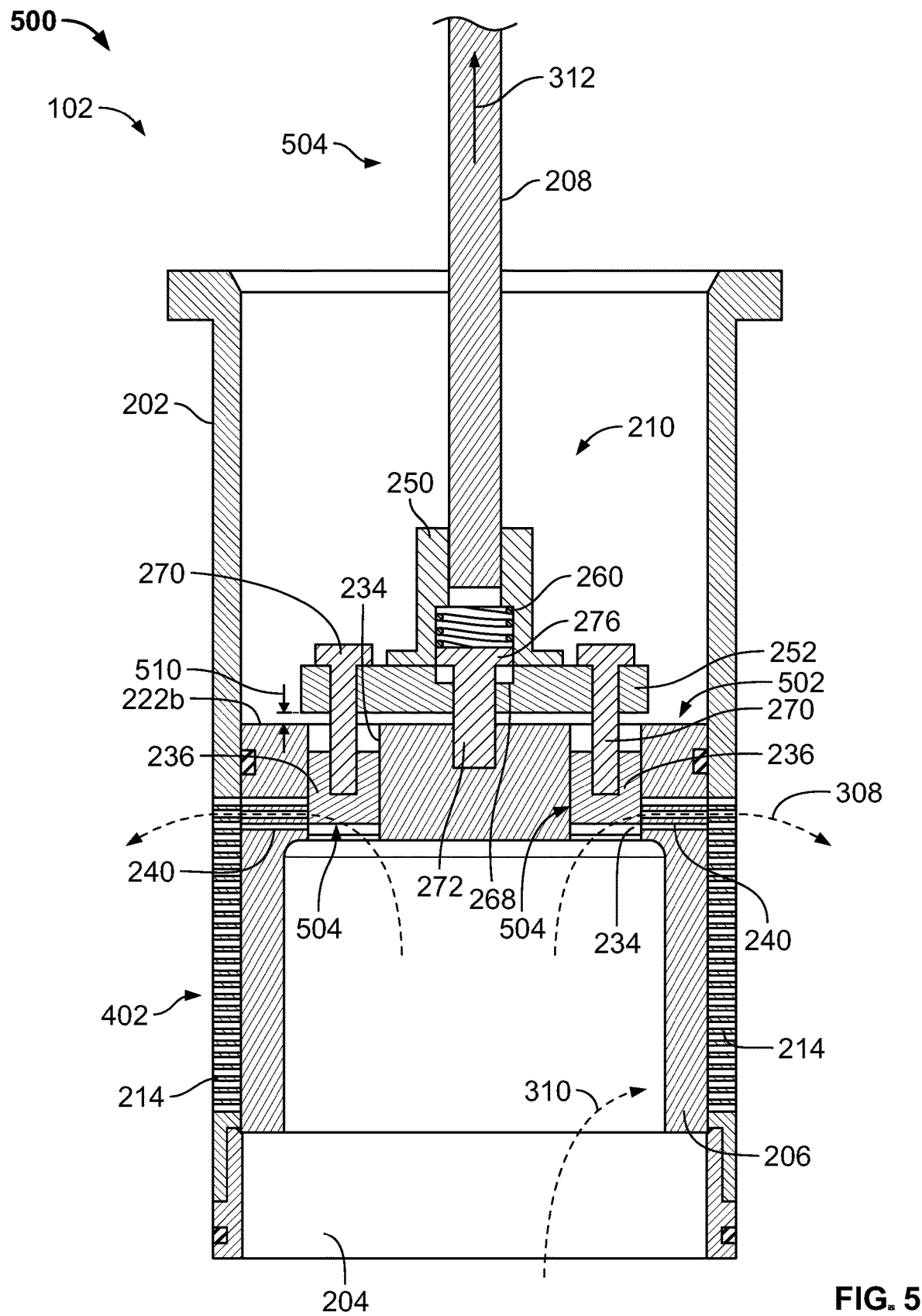
FIG. 5 is a cross-sectional front view of the example valve trim apparatus of FIGS. 1, 2A, 2B and 3 shown in an example second operative position.

FIG. 5 is a cross-sectional front view of the valve trim apparatus 102 shown in an example second operative position 500. In the second operative position 500, the valve plug 206 is in the primary closed position 402 and the throttle plugs 236 are in an intermediate position 502 (e.g., a partially open position). To move the control valve 100 to the second operative position 500, the actuator 114 is moved between the initial stroke length position 406 of FIG. 4 and a first stroke length position 504. For example, the first stroke length position 504 can be between zero-percent and five-percent of a total stroke length of the actuator 114. The stem connector assembly 210 moves relative to the valve plug 206 until the inner stop 272 engages the stepped surface 268 of the retaining plate 252. Disengagement between the flange 276 of the inner stop 272 and the stepped surface 268 of the retaining plate 252 causes the throttle plugs 236 to move relative to the valve plug 206 in response to movement of the actuator 114. Thus, in the second operative position 500, the retaining plate 252 disengages or moves away from the second end 222b of the valve plug 206. For example, a gap 510 forms between the retaining plate 252 and the valve plug 206.

In other words, as the actuator 114 moves in the first direction 312 toward the first stroke length position 504, the stem connector 250 and the retaining plate 252 move relative to the valve plug 206 via the valve stem 208. Additionally, as the actuator 114 moves in the first direction 312 between the initial stroke length position 406 and the first stroke length position 504, the valve plug 206 is operatively decoupled from the actuator 114 via the inner stop 272. As such, the valve plug 206 remains in the primary closed position 402 to prevent fluid flow through the cage openings 214 (e.g., through the primary flow path 308). Further, the spring 278 imparts a force to the inner stop 272 in the second direction 314, which transfers the force to the valve plug 206 due to the connection between the inner stop 272 and the valve plug 206.

As the actuator 114 moves the stem connector assembly 210 in the first direction 312 toward the first stroke length position 504, the throttle plug stems 270 move the throttle plugs 236 in the throttle ports 234 in the first direction 312 relative to the port openings 240 to the intermediate position 502. In the intermediate position 502, the throttle plugs 236 expose or uncover at least one of the port openings 240 to allow fluid flow through the passageway between the inlet 108 and the outlet 110 via the secondary flow path 310. Additionally, the port openings 240 are at least partially aligned with one or more of the cage openings 214 to allow fluid flow through the secondary flow path 310 even though the valve plug 206 prevents fluid flow through the primary flow path 308. For example, the port openings 240 of the valve plug 206 align (e.g., coaxially and/or concentrically align) with one or more of the cage openings 214 of the cage 202.

Figure 6:
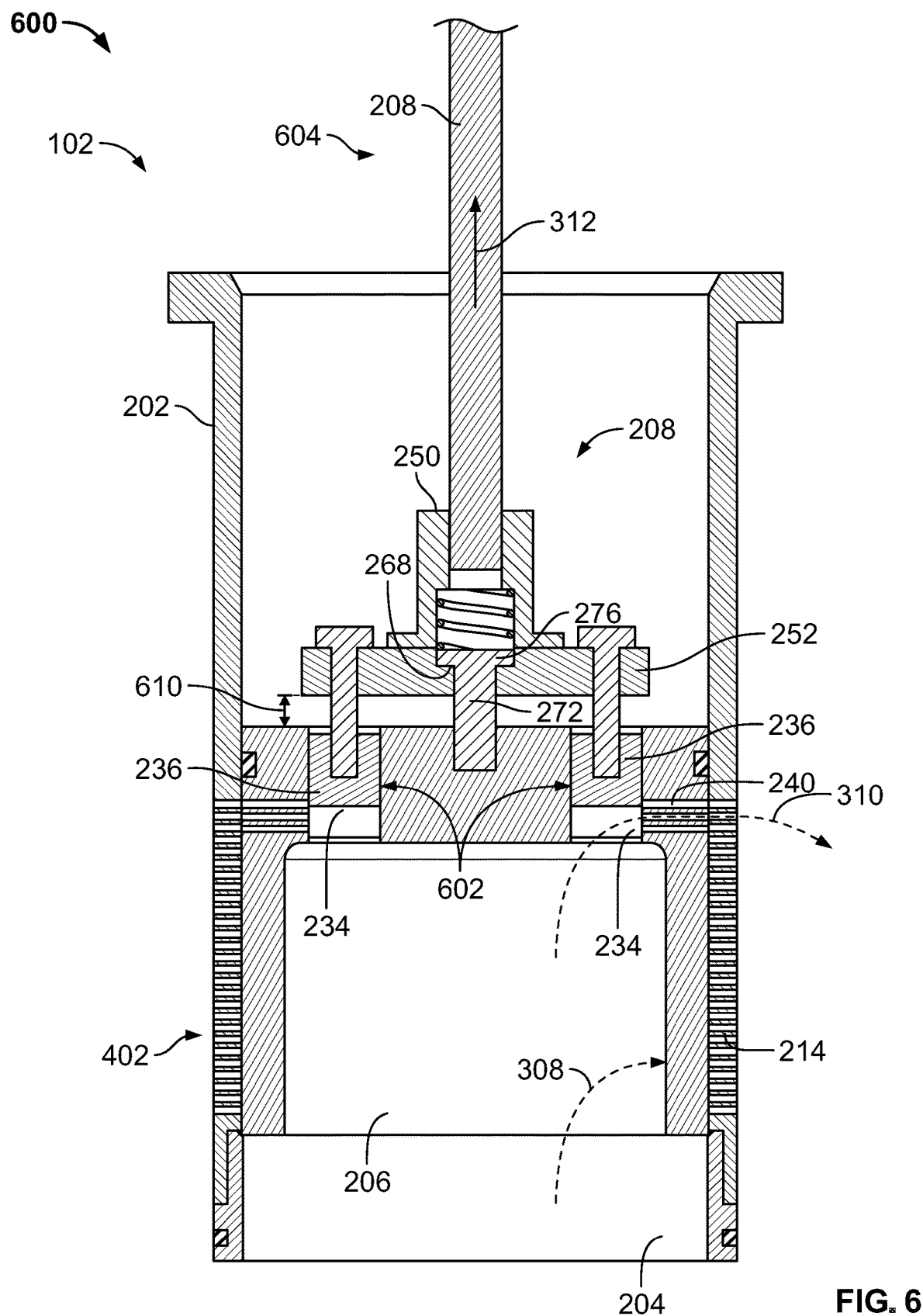
FIG. 6 is a cross-sectional front view of the example valve trim apparatus of FIGS. 1, 2A, 2B and 3 shown in an example third operative position.

FIG. 6 is a cross-sectional front view of the trim apparatus 102 shown in an example third operative position 600. In the third operative position 600, the valve plug 206 is in the primary closed position 402, the throttle plugs 236 are in a secondary open position 602 (e.g., a fully open position), and the actuator 114 is at a second stroke length position 604. In the secondary open position 602, a full flow capacity of the port openings 240 is provided through the secondary flow path 310.

To move the control valve 100 to the third operative position 600, the actuator 114 moves in the first direction 312 to the second stroke length position 604 from the first stroke length position 504 of FIG. 5. The second stroke length position 604 of the illustrated example is between the first stroke length position 504 of FIG. 5 and a third stroke position (e.g., an end of stroke length position 704 of FIG. 7). For example, the second stroke length position 604 can be approximately between a five-percent stroke length and a fifteen-percent stroke length of a total stroke length of the actuator 114. As the actuator 114 moves in the first direction 312 from the first stroke length position 504 to the second stroke length position 604, the stem connector assembly 210 continues to move relative to the valve plug 206 to form a gap 610 (e.g., maximum gap) between the valve plug 206 and the retaining plate 252 until the inner stop 272 engages the stepped surface 268 of the retaining plate 252. Engagement between the flange 276 of the inner stop 272 and the stepped surface 268 of the retaining plate 252 causes movement of the valve plug 206 in response to movement of the actuator 114. Thus, in the third operative position 600, the valve plug 206 is operatively coupled to the actuator 114 and the retaining plate 252 can no longer move relative to the valve plug 206 when the inner stop 272 engages the stepped surface 268 of the retaining plate 252. Additionally, the spring 278 imparts a force against the flange 276 of the inner stop 272 to cause the flange 276 to engage the stepped surface 268 of the retaining plate 252.

In the secondary open position 602 of the illustrated example, the throttle plugs 236 completely or fully uncover the port openings 240 to allow a greater (e.g., maximum) amount of fluid flow through the secondary flow path 310 compared to the intermediate position 502. Additionally, respective ones of the port openings 240 align (e.g., coaxially and/or concentrically align) with the cage openings 214 of the cage 202. However, in some examples, the port openings 240 can be configured to be offset relative to a central axis of the cage openings 214 to reduce a flow rate capacity through the secondary flow path 310 when the throttle plugs 236 are in the secondary open position 602.

Figure 7:
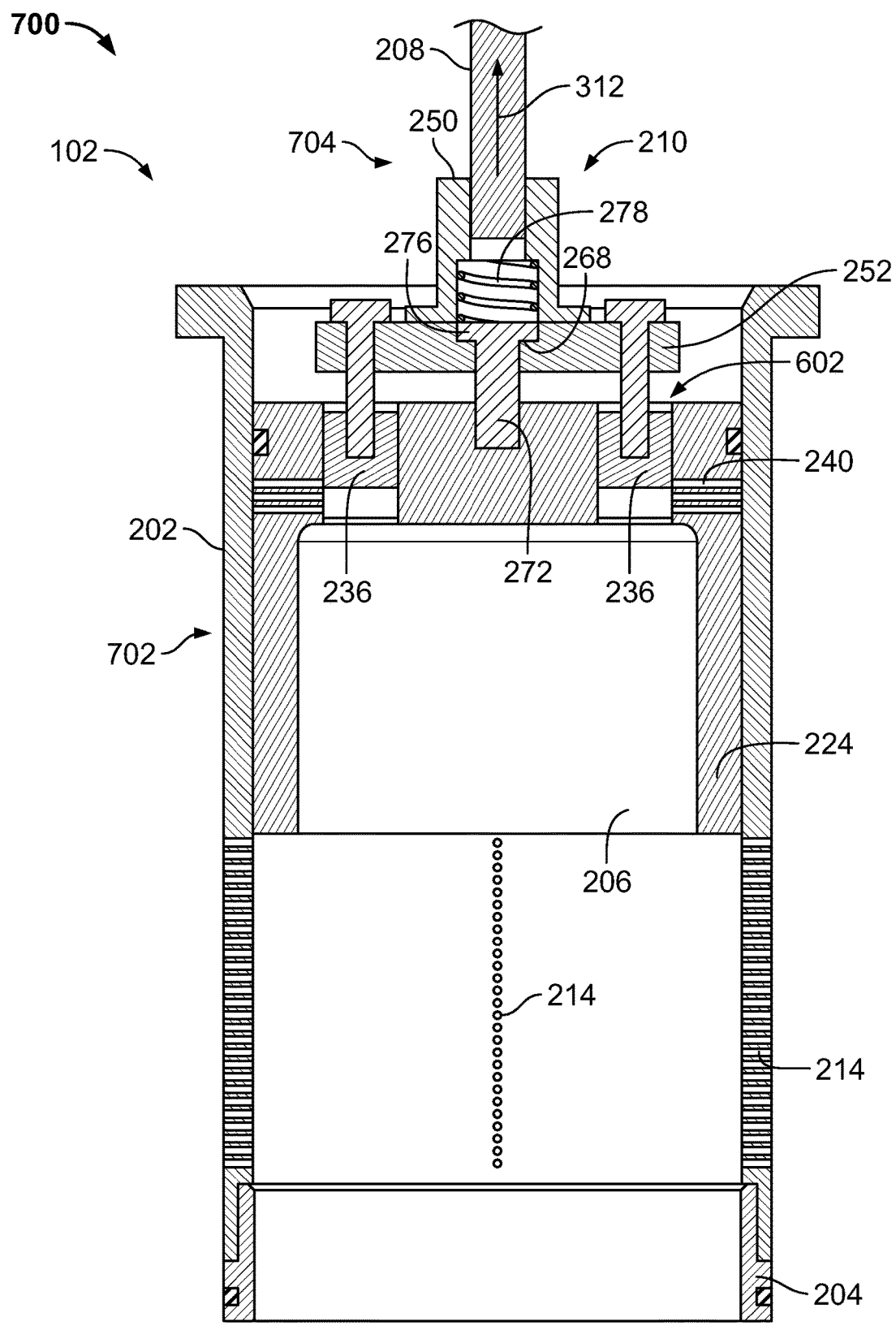
FIG. 7 is a cross-sectional front view of the example valve trim apparatus of FIGS. 1, 2A, 2B and 3 shown in an example fourth operative position.

FIG. 7 is a cross-sectional front view of the example trim apparatus 102 shown in an example fourth operative position 700. In the fourth operative position 700, the valve plug 206 is in a primary open position 702 (e.g., a fully open position), the throttle plugs 236 are in the secondary open position 602 (e.g., a fully open position), and the actuator 114 is at an end of stroke length position 704. In the primary open position 702, a full flow capacity (Cv) of the control valve 100 can be achieved through the fluid flow passageway 106. In the primary open position 702, the annular wall 224 of the valve plug 206 uncovers (e.g., completely, or fully uncovers) the cage openings 214 of the cage 202 to allow fluid flow through the cage 202 and, thus, between the inlet 108 and the outlet 110 of the control valve 100. In some cases, placement of the valve plug 206 in a partially open position (e.g., between the second stroke length position 604 and the end of stroke length position 704) can vary (e.g., reduce) a flow rate of the fluid compared to the flow rate of fluid when the valve plug is in the primary open position 702.

To move the control valve 100 to the fourth operative position 700, the actuator 114 is moved in the first direction 312 to the end of stroke length position 704 (e.g., a full stroke length) from the second stroke length position 604 of FIG. 6. For example, to move the valve plug 206 from the primary closed position 402 to the primary open position 702, the actuator 114 can be moved between the second stroke length position 604 and the end of stroke length position 704 (e.g., a travel length between a ten-percent stroke length and a one-hundred percent stroke length of a total stroke length of the actuator 114). As the actuator 114 moves the stem connector assembly 210 to the second stroke length position 604 of FIG. 6, the inner stop 272 slides relative to the retaining plate 252 and engages the stepped surface 268 of the retaining plate 252 to operatively couple the valve plug 206 and the actuator 114. Thus, movement of the actuator 114 between the second stroke length position 604 and the end of stroke length position 704 causes the valve plug 206 to operatively couple to the actuator 114. As a result, the retaining plate 252 and the throttle plugs 236 no longer move relative to the valve plug 206. Additionally, the spring 278 imparts a force against the flange 276 of the inner stop 272 to cause the flange 276 to engage the stepped surface 268 of the retaining plate 252.

To move the control valve 100 from the fourth operative position 700 to the first operative position 400, the actuator 114 is moved from the end of stroke length position 704 to the initial stroke length position 406 in the second direction 314 (FIG. 3). As the actuator 114 moves from the end of stroke length position 704 to the second stroke length position 604, the inner stop 272 is in engagement with the stepped surface 268 of the retaining plate 252 via the spring 278 and the valve plug 206 and the throttle plugs 236 move together in the second direction 314 to cause the valve plug 206 to sealingly engage the valve seat 204 (e.g., to prevent fluid flow through the primary flow path 308). In this position, fluid flow continues to flow through the secondary flow path 310 via alignment between the port openings 240 and the cage openings 214. As the actuator 114 moves from the second stroke length position 604 to the initial stroke length position 406 in the second direction 314 (FIG. 3), the inner stop 272 disengages the stepped surface 268 of the retaining plate 252 and moves toward the stepped surface 260 of the stem connector 250 to compress the spring 278 against the stepped surface 260. With the inner stop 272 disengaged from the stepped surface 268 of the retaining plate 252, the retaining plate 252 and, thus, the throttle plugs 236 move relative to the valve plug 206. As the actuator 114 moves from the second stroke length position 604 to the initial stroke length position 406, the retaining plate 252 moves in the second direction 314 to engage the valve plug 206 (e.g., eliminate the gap 610). In turn, the throttle plugs 236 move to the secondary closed position 404 to prevent fluid flow through the port openings 240.

In summary, the actuator 114 moves the throttle plugs 236 (e.g., a secondary valve plug) between the secondary closed position 404 and the secondary open position 602 over a first stroke length of the actuator 114 and the actuator 114 moves the valve plug 206 (e.g., a primary valve plug) between the primary closed position 402 and the primary open position 702 over a second stroke length of the actuator 114 different than the first stroke length.

By providing fluid flow through the secondary flow path 310 via the throttle ports 234 and the port openings 240 prior to moving the valve plug 206 away from the valve seat 204 to an open position (e.g., the primary open position 702), the valve trim apparatus 102 causes fluid flowing through the fluid flow passageway 106 to have a gradual pressure drop and, thus, a gradual velocity increase as the fluid flows through the cage openings 214 when the valve plug 206 moves away from the valve seat 204. As such, the gradual pressure drop and/or gradual velocity increase can reduce turbulent flow as the fluid flows across the valve trim apparatus 102 to reduce noise and/or cavitation in the control valve 100.

Furthermore, the control valve 100 can have a rated high flow capacity (Cv) defining a volume of fluid that can flow through the control valve 100 during a specified time interval. The rated flow capacity (Cv) at a certain pressure drop can be based on the components of the control valve 100 such as the valve trim apparatus 102. For example, the rated flow capacity can vary based on a characteristic (e.g., density, number of openings, windows, slots, etc.) of the cage openings 214 of the cage 202. Because the cage 202 of the illustrated example does not require characterization of a low flow capacity (Cv) characteristic when the valve plug 206 away from the valve seat 204, an overall flow capacity (e.g., a maximum Cv) of the control valve 100 is not impacted. In other words, the control valve 100 operates the throttle plugs 236 to gradually reduce a pressure differential across the inlet 108 and the outlet 110 prior to operating the valve plug 206. Thus, the secondary flow control member 232 establishes a low flow characteristic (Cv) of the control valve 100. In this manner, the control valve 100 can include a low flow capacity (Cv) characteristic over a first stroke length (e.g., between the initial stroke length position 406 and the second stroke length position 604) of the actuator 114 while maintaining a high flow capacity (Cv) characteristic over a second stroke length (e.g., between the second stroke length position 604 and the end of stroke length position 704) of the actuator 114.

Figure 8:
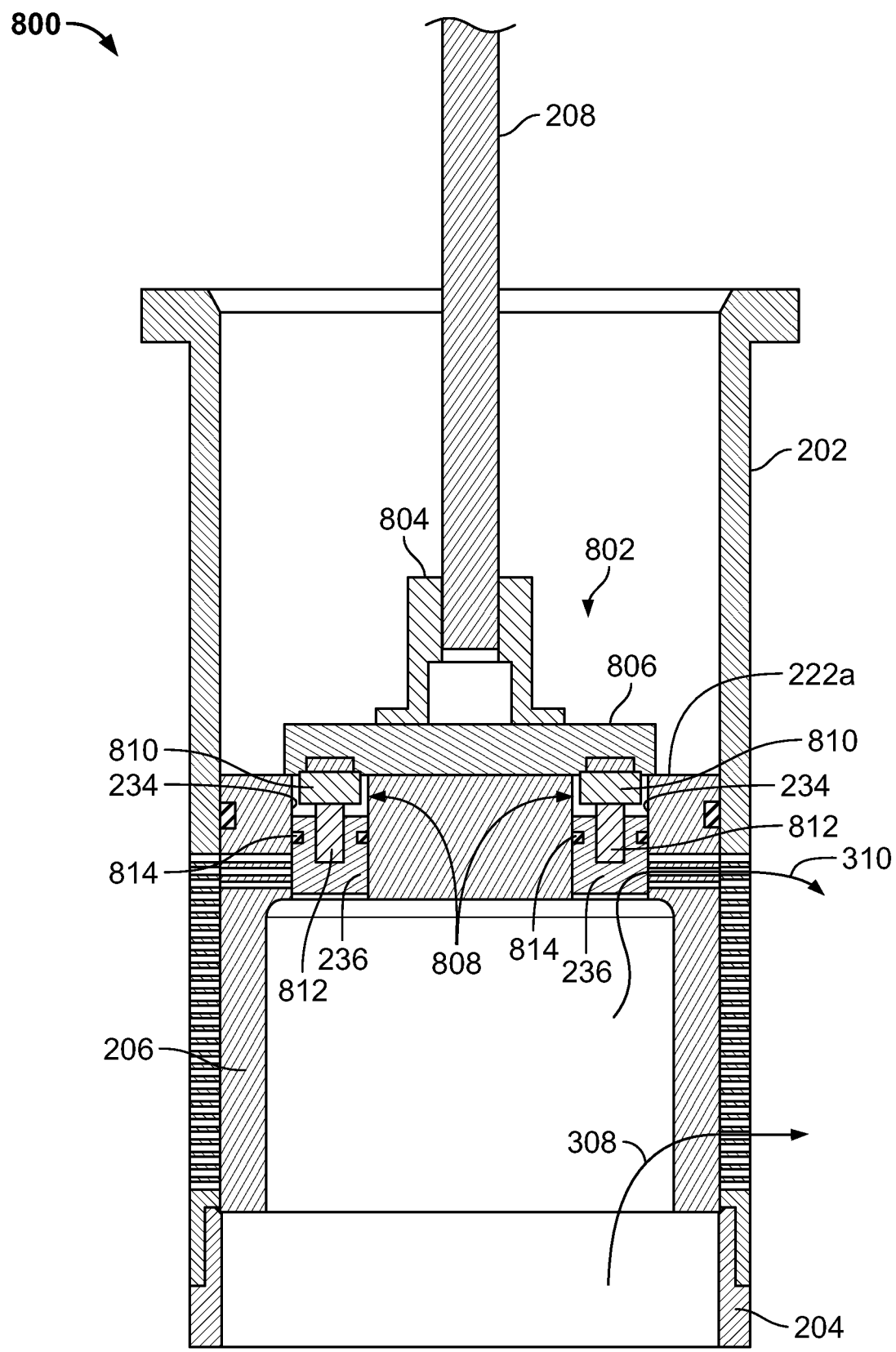
FIG. 8 is a cross-sectional view of another example valve trim apparatus disclosed herein.

FIG. 8 is another example valve trim apparatus 800 disclosed herein. The example valve trim apparatus 800 can implement the control valve 100 of FIG. 1. Many of the components of the valve trim apparatus 800 are substantially similar or identical to the components described above in connection with FIGS. 1-7. As such, those components will not be described in detail again below. Instead, the interested reader is referred to the above corresponding descriptions for a complete written description of the structure and operation of such components. To facilitate this process, similar or identical reference numbers will be used for like structures in FIG. 8 as used in FIGS. 1-7. For instance, the valve trim apparatus 800 includes a cage 202, a valve seat 204, a valve plug 206, and throttle plugs 236.

The example valve trim apparatus 800 of the illustrated example includes a stem connection assembly 802 to couple the valve plug 206 and a valve stem 208. The stem connection assembly 802 of the illustrated example includes a stem connector 804, a retaining plate 806 and a secondary actuator 808. When the valve trim apparatus 800 is configured with the control valve 100 of FIG. 1, the actuator 114 (e.g., a first actuator) moves the valve plug 206 (e.g., a primary valve plug) between a primary open position (e.g., a fully open position, the primary open position 702 of FIG. 7) and a primary closed position (e.g., a fully closed position, the primary closed position 402 of FIG. 4) to control fluid flow through a primary flow path 308 and the secondary actuator 808 (e.g., a second actuator) moves the throttle plugs 236 (e.g., a secondary valve plug) between a secondary open position (e.g., the secondary open position 602 of FIG. 6) and a secondary closed position (e.g., the secondary closed position 404 of FIG. 4) to control fluid flow through the secondary flow path 310.

The secondary actuator 808 of the illustrated example includes a plurality of solenoid actuators 810. The solenoid actuators 810 are operatively coupled to respective ones of the throttle plugs 236. Specifically, the solenoid actuators 810 include shafts or stems 812 that couple or attach to the throttle plugs 236. The solenoid actuators 810 of the illustrated example are positioned within throttle ports 234 of the valve plug 206 between the retaining plate 806 and the throttle plugs 236. Specifically, the solenoid actuators 810 are coupled to the retaining plate 806 and are fluidly sealed within the throttle ports 234. For example, the retaining plate 806 of the illustrated example is attached to the second end 22b of the valve plug 206. In some examples, a seal, gasket, paste, an O-ring or other seal can be provided between the retaining plate 806 and the valve plug 206 to seal a circumference or perimeter of the retaining plate 806 to prevent fluid from flowing to the solenoid actuators 810 via an interface between the second end 222b of the valve plug 206 and the retaining plate 806. Additionally, the throttle plugs 236 of the illustrated example include a seal 814 (e.g., an O-ring) to prevent fluid flow from the throttle ports 234 to the solenoid actuators 810. In operation, when the control valve 100 of FIG. 1 is implemented with the valve trim apparatus 800, the actuator 114 is a primary actuator that moves the valve plug 206 relative the valve seat 204 over a full stroke length of the actuator 114. The solenoid actuators 810 are a secondary actuator that operate the throttle plugs 236 relative to the port openings 240 independently from the actuator 114.

Although each example of the valve trim apparatus 102 and the valve trim apparatus 800 disclosed above have certain features and/or components, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example methods, apparatus, systems, and articles of manufacture to implement a valve trim apparatus for use with control valves are disclosed herein. Further examples and combinations thereof include the following:

Example 1 includes a valve trim apparatus includes a cage having a cylindrical wall defining a central aperture and a plurality of first openings extending between an inner surface of the cage and an outer surface of the cage. A valve seat engages the cage and a valve plug is slidably coupled to the cage and movable relative to the valve seat. The valve plug includes a sidewall defining a plug cavity and a plurality of throttle ports. The throttle ports are radially spaced relative to a longitudinal axis of the valve plug. The throttle ports include throttle flow passageways to provide fluid communication between an inner surface of the throttle ports and an outer surface of the sidewall of the valve plug. The valve plug includes a plurality of throttle plugs positioned in respective ones of the throttle ports and movable relative to the throttle flow passageways to control fluid flow through the throttle flow passageways when the valve plug is sealingly engaged with the valve seat.

Example 2 includes the valve trim apparatus of example 1, where each of the throttle ports has a longitudinal axis that is substantially parallel relative to the longitudinal axis of the plug cavity.

Example 3 includes the valve trim apparatus of examples 1 and 2, where longitudinal axes of the throttle flow passageways are at least one of non-parallel or perpendicular relative to the longitudinal axis of the valve plug.

Example 4 includes the valve trim apparatus of any one of examples 1-3, where the throttle plugs are coupled to a retaining plate via respective ones of throttle plug stems.

Example 5 includes the valve trim apparatus of any one of examples 1-4, where the throttle plug stems have first ends coupled to the retaining plate and second ends coupled to respective ones of the throttle plugs.

Example 6 includes the valve trim apparatus of any one of examples 1-5, where the first ends of the throttle plug stems are fixed to the retaining plate and the second ends of the throttle plug stems are fixed to respective ones of the throttle plugs.

Example 7 includes the valve trim apparatus of any one of examples 1-6, further including a stem connector coupled to the retaining plate, the stem connector to couple the retaining plate and a valve stem.

Example 8 includes the valve trim apparatus of any one of examples 1-7, further including an inner stop to couple the stem connector and the valve plug.

Example 9 includes the valve trim apparatus of any one of examples 1-8, where the inner stop has a first end slidably coupled to the stem connector and a second end opposite the first end fixed to the valve plug.

Example 10 includes the valve trim apparatus of any one of examples 1-9, where the inner stop includes a flange and a body, the body having a first portion fixed to the valve plug and a second portion to slide relative to the retaining plate.

Example 11 includes the valve trim apparatus of any one of examples 1-10, where the retaining plate includes a central opening to slidably receive the second portion of the body and a stepped surface defined by a counterbore coaxially aligned with the central opening to receive the flange of the inner stop.

Example 12 includes the valve trim apparatus of any one of examples 1-11, where engagement between the flange of the inner stop and the stepped surface of the retaining plate causes movement of the valve plug in response to movement of the actuator.

Example 13 includes a valve plug includes a cylindrical body defining an annular wall and a cavity, the cylindrical body including a first end defining a sealing surface to engage a valve seat and a second end opposite the first end to couple to a valve stem. The cylindrical body includes a plurality of throttle ports radially spaced relative to a longitudinal axis of the valve plug. The throttle ports have throttle passageways to fluidly couple an inner surface of the annular wall and an outer surface of the annular wall. A plurality of throttle plugs slidably coupled within respective ones of the throttle ports and moveable relative to the throttle passageways to control fluid flow through the throttle passageways. A plurality of throttle plug stems operatively couple respective ones of the throttle plugs to an actuator.

Example 14 includes the valve plug of example 13, further including a retaining plate and a stem connector to operatively couple the throttle plug stems and the actuator.

Example 15 includes the valve plug of examples 13 and 14, where the valve plug includes a plurality of pressure balancing ports radially spaced relative to the longitudinal axis of the valve plug, and wherein the pressure balancing ports are spaced relative to the throttle ports about the longitudinal axis of the valve plug.

Example 16 includes the valve plug of any one of examples 13-15, where the actuator includes a plurality of actuators, the actuators coupled to respective ones of the throttle plugs via the throttle plug stems.

Example 17 includes a valve includes a valve body including an inlet, an outlet, and a fluid passageway extending between the inlet and the outlet. A valve trim apparatus is disposed in the fluid passageway. The valve trim apparatus includes a primary valve plug and a secondary valve plug. The primary valve plug is movable relative to a valve seat between a primary closed position and a primary open position. The primary valve plug includes a plurality of pressure balancing ports. The secondary valve plug is positioned in a respective one of the pressure balancing ports. The secondary valve plug is to move relative to the primary valve plug between a secondary open position and a secondary closed position. The secondary valve plug is to move from the secondary closed position to the secondary open position to enable fluid flow through the fluid passageway between the inlet and the outlet of the valve body when the primary valve plug is in the primary closed position.

Example 18 includes the valve of example 17, further including an actuator coupled to the valve body, the actuator to move the primary valve plug between the primary open position and the primary closed position over a first stroke length of the actuator, the actuator to move the secondary valve plug between the secondary open position and the secondary closed position over a second stroke length of the actuator, the first stroke length and the second stroke length equal a total stroke length of the actuator.

Example 19 includes the valve of any one of examples 17-18, where the secondary valve plug is to move relative to the primary valve plug during a first stroke length of the actuator and the primary valve plug and the secondary valve plug move together during a second stroke length of the actuator.

Example 20 includes the cage of any one of examples 17-19, further including a first actuator and a second actuator, the first actuator to move the primary valve plug between the primary open position and the primary closed position, the second actuator to move the secondary valve plug between the secondary open position and the secondary closed position.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A valve trim apparatus comprising:
    a cage having a cylindrical wall defining a central aperture and a plurality of first openings extending between an inner surface of the cage and an outer surface of the cage;
    a valve seat to engage the cage; and
    a valve plug slidably coupled to the cage and movable relative to the valve seat, the valve plug including:
        a sidewall defining a plug cavity and a plurality of throttle ports, the throttle ports radially spaced relative to a longitudinal axis of the valve plug, the throttle ports including throttle flow passageways to provide fluid communication between an inner surface of the throttle ports and an outer surface of the sidewall of the valve plug; and
        a plurality of throttle plugs, the throttle plugs positioned in respective ones of the throttle ports and movable relative to the throttle flow passageways to control fluid flow through the throttle flow passageways when the valve plug is sealingly engaged with the valve seat, the throttle plugs coupled to a retaining plate via respective ones of throttle plug stems.

2. The apparatus of claim 1, wherein each of the throttle ports has a longitudinal axis that is substantially parallel relative to the longitudinal axis of the plug cavity.

3. The apparatus of claim 1, wherein longitudinal axes of the throttle flow passageways are at least one of non-parallel or perpendicular relative to the longitudinal axis of the valve plug.

4. The apparatus of claim 1, wherein the throttle plug stems have first ends coupled to the retaining plate and second ends coupled to respective ones of the throttle plugs.

5. The apparatus of claim 4, wherein the first ends of the throttle plug stems are fixed to the retaining plate and the second ends of the throttle plug stems are fixed to respective ones of the throttle plugs.

6. The apparatus of claim 5, further including a stem connector coupled to the retaining plate, the stem connector to couple the retaining plate and a stem of an actuator.

7. The apparatus of claim 6, further including an inner stop to couple the stem connector and the valve plug.

8. The apparatus of claim 7, wherein the inner stop has a first end slidably coupled to the stem connector and a second end opposite the first end fixed to the valve plug.

9. The apparatus of claim 8, wherein the inner stop includes a flange and a body, the body having a first portion fixed to the valve plug and a second portion to slide relative to the retaining plate.

10. The apparatus of claim 9, wherein the retaining plate includes a central opening to slidably receive the second portion of the body and a stepped surface defined by a counterbore coaxially aligned with the central opening to receive the flange of the inner stop.

11. The apparatus of claim 10, wherein engagement between the flange of the inner stop and the stepped surface of the retaining plate causes movement of the valve plug in response to movement of the actuator.

12. A valve plug configured to be disposed in a fluid passageway of a valve body, the valve plug comprising:
    a cylindrical body defining an annular wall and a cavity, the cylindrical body including a first end defining a sealing surface to engage a valve seat and a second end opposite the first end to couple to a valve stem, the cylindrical body including a plurality of throttle ports radially spaced relative to a longitudinal axis of the valve plug, the throttle ports extending through the cylindrical body between the second end of the cylindrical body and the cavity of the cylindrical body, the throttle ports having throttle passageways to fluidly couple an inner surface of the annular wall and an outer surface of the annular wall;

a plurality of throttle plugs slidably coupled within respective ones of the throttle ports and moveable relative to the throttle passageways to control fluid flow through the throttle passageways; and a plurality of throttle plug stems, the throttle plug stems to operatively couple respective ones of the throttle plugs to an actuator.

13. The valve plug of claim 12, further including a retaining plate and a stem connector to operatively couple the throttle plug stems and the actuator.

14. The valve plug of claim 12, wherein the valve plug includes a plurality of pressure balancing ports radially spaced relative to the longitudinal axis of the valve plug, and wherein the pressure balancing ports are spaced relative to the throttle ports about the longitudinal axis of the valve plug.

15. A valve plug configured to be disposed in a fluid passageway of a valve body, the valve plug comprising:

a cylindrical body defining an annular wall and a cavity, the cylindrical body including a first end defining a sealing surface to engage a valve seat and a second end opposite the first end to couple to a valve stem, the cylindrical body including a plurality of throttle ports radially spaced relative to a longitudinal axis of the valve plug, the throttle ports having throttle passageways to fluidly couple an inner surface of the annular wall and an outer surface of the annular wall;

a plurality of throttle plugs slidably coupled within respective ones of the throttle ports and moveable relative to the throttle passageways to control fluid flow through the throttle passageways;

a plurality of throttle plug stems; and a plurality of actuators, the actuators coupled to respective ones of the throttle plugs via the throttle plug stems.

16. A valve comprising:

a valve body including an inlet, an outlet, and a fluid passageway extending between the inlet and the outlet; and a valve trim apparatus disposed in the fluid passageway, the valve trim apparatus including a primary valve plug and a secondary valve plug, the primary valve plug movable relative to a valve seat between a primary closed position and a primary open position, the primary valve plug including a cylindrical body defining an annular wall and a plug cavity, the annular wall having a first end defining a sealing surface and a second end opposite the first end, the cylindrical body including a plurality of pressure balancing ports, the pressure balancing ports radially spaced relative to a longitudinal axis of the primary valve plug, the pressure balancing ports fully extend through the cylindrical body between the second end of the cylindrical body and the plug cavity, the secondary valve plug positioned in a respective one of the pressure balancing ports, the secondary valve plug to move relative to the primary valve plug between a secondary open position and a secondary closed position, the secondary valve plug to move from the secondary closed position to the secondary open position to enable fluid flow through the fluid passageway between the inlet and the outlet of the valve body when the primary valve plug is in the primary closed position.

17. The valve of claim 16, further including an actuator coupled to the valve body, the actuator to move the primary valve plug between the primary open position and the primary closed position over a first stroke length of the actuator, the actuator to move the secondary valve plug between the secondary open position and the secondary closed position over a second stroke length of the actuator, the first stroke length and the second stroke length equal a total stroke length of the actuator.

18. The valve of claim 17, wherein the secondary valve plug is to move relative to the primary valve plug during a first stroke length of the actuator and the primary valve plug and the secondary valve plug move together during a second stroke length of the actuator.

19. The valve of claim 16, further including a first actuator and a second actuator, the first actuator to move the primary valve plug between the primary open position and the primary closed position, the second actuator to move the secondary valve plug between the secondary open position and the secondary closed position.

* * * * *